United States Patent
Alameh et al.

(10) Patent No.: US 7,671,628 B2
(45) Date of Patent: Mar. 2, 2010

(54) BUS INTERFACE AND METHOD FOR CONVEYING MULTI-LEVEL COMMUNICATION SIGNALS BETWEEN A COMMUNICATION BUS AND A DEVICE COUPLED TO A COMMUNICATION BUS

(75) Inventors: Rachid M. Alameh, Crystal Lake, IL (US); Louis J. Vannatta, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 1085 days.

(21) Appl. No.: 11/332,575

(22) Filed: Jan. 13, 2006

(65) Prior Publication Data

US 2007/0165710 A1   Jul. 19, 2007

(51) Int. Cl.
*H03K 19/0175* (2006.01)

(52) U.S. Cl. ............................ 326/63; 327/333; 710/106

(58) Field of Classification Search ................. 326/62, 326/63, 80, 82, 86; 327/306, 308, 333, 108, 327/109; 375/295; 710/315, 106, 62; 385/27, 385/29, 31; 379/403–404, 394; 398/192, 398/193

See application file for complete search history.

(56) References Cited

U.S. PATENT DOCUMENTS

| | | | |
|---|---|---|---|
| 4,827,477 A | 5/1989 | Avaneas | |
| 5,894,425 A | 4/1999 | Saliba | |
| 6,154,679 A | 11/2000 | Kessler et al. | |
| 6,477,250 B1 | 11/2002 | Sheets | |
| 6,944,691 B1 | 9/2005 | Li et al. | |
| 7,301,371 B2 * | 11/2007 | Kim ............................ | 326/82 |

* cited by examiner

*Primary Examiner*—Clifford H Knoll
(74) *Attorney, Agent, or Firm*—Lawrence J. Chapa (57) ABSTRACT

A bus interface and corresponding method is provided for conveying communication signals supporting multiple modes, where at least two of the modes have distinct operational communication signal levels. The bus interface is adapted to convert the communication signals between communication signals having distinct signal levels, and communication signals having compatible signal levels. Where in at least some instances, the conveyed communication signals are converted from communication signals having distinct signal levels to communication signals having compatible signal levels, and then back to communication signals having distinct signal levels, after the communication signals having compatible signal levels are transmitted and received via one or more associated communication paths.

21 Claims, 8 Drawing Sheets

BUS INTERFACE AND METHOD FOR CONVEYING MULTI-LEVEL COMMUNICATION SIGNALS BETWEEN A COMMUNICATION BUS AND A DEVICE COUPLED TO A COMMUNICATION BUS

FIELD OF THE INVENTION

The present invention relates generally to a bus interface, and more particularly, to a bus interface adapted for conveying communication signals in accordance with a communication protocol having a plurality of communication modes, where at least two of the communication modes each have a distinct operational signal level.

BACKGROUND OF THE INVENTION

Various standardized communication protocols have been developed to support convenient communication between components of different manufacturers for use in diverse operating conditions. Often times the specific nature of at least some portions of the communication protocol are influenced by the intended operating conditions, so as to address anticipated difficulties, and/or take advantage of certain benefits commonly associated with the intended operating conditions.

An example of one such intended operating condition, might include conditions associated with mobile communication environments, and can involve the intradevice communications between the various elements forming portions of the device. Certain features commonly associated with such devices might allow for certain beneficial aspects, and/or anticipated difficulties or conditions, that may be taken advantage of and/or accounted for.

At least one common configuration for a device, which support mobile communications, includes a device which has a two part housing configuration, where the two housing portions are coupled together in a manner, which allows for the housing portions to move relative to one another. In at least one instance, the two housing portions might be coupled to one another via a hinge, thereby allowing the two housing portions to pivot relative to one another about the hinge. In at least a further instance, the two part housing portions might be coupled to one another via a slider mechanism, thereby allowing the two housing portions to slide relative to one another.

Often times each housing portion will include one or more active elements, which need to be physically linked and/or communicatively coupled to elements from the other housing portion. For example, a source of power, such as a battery, which needs to be coupled to elements in both of the housing portions, may be located in one of the housing portions, and may need to be coupled to elements in the other portion, via some form of connection, which bridges the separation between the two housing portions. In the same or other instances, the primary processing element, such as a microprocessor, may be located in one of the two housing portions, and may need to communicate with elements located in one of the two housing portions, similarly including instances in which a connection with an element in the other housing portion is desired.

In a flip type or clam shell style phone, which can include a base or lower portion, and a flip or upper portion, which are coupled together via a hinge, components such as a source of power and one or more of the primary processing elements, are often located in the base or lower portion of the two part housing. Elements such as ear piece speaker ports, displays, and cameras, are commonly positioned in the flip or upper portion of a two part housing, and sometimes may need to communicate and/or be coupled to elements in the base or lower housing portion. Enhancements in the user experience, including both new and expanded capabilities, which are associated with components located in each of the two housing portions including the flip portion, has tended to involve an ever increasing amount of information to be transferred between the base portion and the flip portion of a clam shell style phone.

The increased communication can be supported by one or more of an increasing number of communication lines, and/or by increasing the amount of data being communicated within each of any preexisting or reduced number of communication lines. Both of which are complicated by the need for the signals to be routed through the coupling element, such as a hinge, or a slider mechanism. However, there may be drawbacks to either of the two noted potential solutions for supporting enhanced data flow. For example, increases in the number of distinct communication paths, generally increases the amount of parts which are necessary for conveying the signals, that needs to be routed between the two housings to support the greater number of communication connection. Whereas, increases in the amount of data being communicated in existing or reduced number of communication connections will often involve data signals having higher data rates, which can result in a corresponding increase in the amount of electromagnetic noise and interference, in the case of an electrical signal conveyed by one or more electrical conductors. However, in the case where the signals are being routed though a coupling element which supports a movable coupling of a two part housing, accounting for any increases in electromagnetic noise and interference may be problematic, as there can be difficulties associated with providing suitable electromagnetic shielding.

At least one communication standard, namely the Mobile Industry Processor Interface (MIPI) standard, attempts to alleviate some of the concerns by incorporating serialized communications, to help minimize the number of connections, and at least partially incorporates the use of differential signaling to help reduce the amount of electromagnetic noise and interference associated with the use of relatively higher frequency communication signals. While, the use of differential signaling may help to reduce some of the noise, in some instances it still may not be sufficient.

A further concern can relate to power consumption, which can be more problematic in mobile devices that incorporate self contained power sources, such as a battery. With respect to MIPI, a low amplitude differential signal for supporting a high data rate mode helps to minimize power consumption during high speed data rates, while a low data rate mode incorporating traditional low power CMOS circuitry, which largely limits power consumption to instances in which the logic levels change, similarly helps to minimize power consumption during transmission modes, which support low speed data rates, even though the signal amplitude (i.e. voltage levels), which support the data states for traditional CMOS circuitry might be relatively larger, when compared with the signal levels, which support the differential signaling.

The present inventors have recognized that electromagnetic noise and interference, which continues to be present, even with the use of differential signaling can be largely avoided, by optically conveying the data signals, as opposed to electrically conveying the same. However, in such an instance, the higher amplitude signal associated with the lower data rate mode does not enjoy the same power saving benefits associated with CMOS circuitry, as the power consumption associated with optical signaling is largely a function of signal amplitude and the duration of transmission at the particular signal amplitude, as opposed to being primarily limited to instances of transitions in the logic level states, which is the case with CMOS circuitry. Correspondingly, the present inventors have recognized that the selective conversion of relatively higher amplitude signals associated with some of the modes of communication for purposes of conveying communication signals would be beneficial.

SUMMARY OF THE INVENTION

The present invention provides a bus interface for converting communication signals in a communication protocol. The communication protocol includes a plurality of modes of communication, where at least two modes of communication each have a distinct operational signal level. The communication signals are converted between communication signals having multiple distinct signal levels and communication signals having compatible signal levels. The bus interface has an amplitude adjustment circuit, which is coupled to a communication bus, and includes a mode detector circuit. The amplitude adjustment circuit selectively adjusts the amplitude of communication signals received from the communication bus, based upon a detected mode of the communication signals. The bus interface additionally has a transmitter, which is coupled to the amplitude adjustment circuit. The transmitter emits amplitude adjusted communication signals received from the amplitude adjustment circuit, which includes signals supporting multiple modes that have compatible signal levels.

In at least one embodiment, the bus interface further has a receiver, which is communicatively coupled to the transmitter, where the receiver detects the amplitude adjusted communication signals emitted by the transmitter. The bus interface additionally has an amplitude restoration circuit, which is coupled to the receiver. The amplitude restoration circuit includes a mode detector circuit, for determining the mode of communication and correspondingly restoring the amplitude of the detected amplitude adjusted communication signals, based upon the detected mode of the detected amplitude adjusted communication signals, where the amplitude restored, detected, amplitude adjusted communication signal includes signals, which support multiple modes, having distinct signal levels.

In at least a further embodiment, the bus interface, in conjunction with a corresponding additional second bus interface for communication in a second direction, which is opposite to the first direction, supports half duplex communication.

The present invention further provides a full duplex bus interface for conveying communication signals in a communication protocol, which includes at least two modes of communication. The at least two modes of communication each have a distinct operational signal level. The full duplex bus interface has a pair of simplex bus interfaces. Each of the simplex bus interfaces has an amplitude adjustment circuit, which includes a mode detector circuit. The amplitude adjustment circuit selectively adjusts the amplitude of received communication signals, based upon a detected mode of the communication signals. The simplex bus interface further has a transmitter, which is coupled to the amplitude adjustment circuit. The transmitter emits amplitude adjusted communication signals received from the amplitude adjustment circuit, which includes signals supporting multiple modes having compatible signal levels.

The simplex bus interfaces, additionally has a receiver circuit, which is communicatively coupled to the transmitter, and which detects the amplitude adjusted communication signals emitted by the transmitter. The simplex bus interfaces still further have an amplitude restoration circuit coupled to the receiver circuit and include a mode detector circuit, for restoring the amplitude of the detected amplitude adjusted communication signals, based upon the detected mode of the detected amplitude adjusted communication signals. The amplitude restored, detected, amplitude adjusted communication signal includes signals supporting multiple modes, which have distinct signal levels.

An input of the amplitude adjustment circuit of a first one of the pair of simplex bus interfaces is coupled to a communication bus for receiving communication signals, and an output of the amplitude restoration circuit is coupled to a device to be coupled to the communication bus. An input of the amplitude adjustment circuit of a second one of the pair of simplex bus interfaces is coupled to the device to be coupled to the communication bus, and an output of the amplitude restoration circuit is coupled to the communication bus.

The present invention still further provides for a method for conveying signals between a communication bus and a device coupled to a communication bus. The method includes receiving communication signals for a communication protocol, which includes at least two modes of communication, the at least two modes of communication each having a distinct operational signal level. A mode of the communication signals is then detected. The amplitude of the communication signals is then selectively adjusted, based upon a detected mode of the communication signals. The communication signals are adjusted between communication signals, which have multiple distinct signal levels and communication signals, which have compatible signal levels. The communication signals supporting multiple modes, and which have adjusted so as to have compatible signal levels, are then emitted.

In at least one embodiment, the method further includes detecting the emitted communication signals, which support the multiple modes, and have compatible signal levels. The amplitude of the detected, emitted communication signals, which supports multiple modes and has compatible signal levels is then restored, based upon a detected mode of the communication signals, wherein the communication signals with the restored amplitude includes signals supporting multiple modes having distinct signal levels.

These and other features, and advantages of this invention are evident from the following description of one or more preferred embodiments of this invention, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 1:
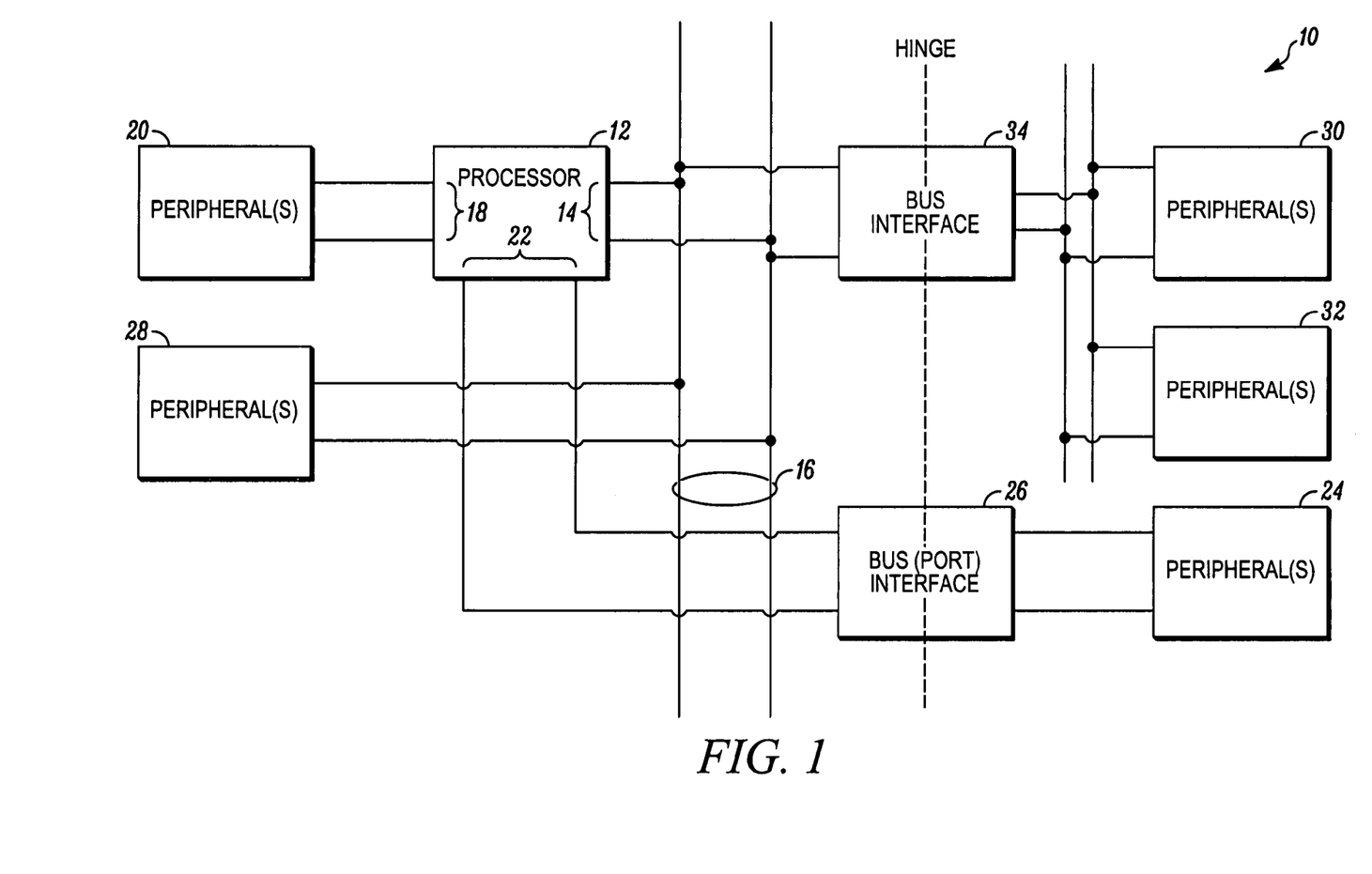
FIG. 1 is a block diagram of an exemplary communication architecture in which information is communicated between a plurality of elements, such as a processor and one or more peripherals.

FIG. 1 illustrates a block diagram of an exemplary communication architecture 10 in which information is communicated between a plurality of elements, such as a processor 12 and one or more peripherals. More specifically, a processor 12, and various potential connectivity configurations are illustrated, which highlight multiple communication connections for which at least some of the connectivity configurations are appropriate for use with a MIPI communication protocol.

In the illustrated embodiment, at least three sets of communication ports are shown. A first set of ports 14 are coupled to a communication bus 16. A second set of ports 18 is more directly coupled to peripheral 20, and a third set of ports 22 is coupled to peripheral 24 via bus (port) interface 26. In turn the communication bus 16 is illustrated as being coupled to peripheral 28, and/or peripherals 30 and 32, via bus interface 34. In at least a couple of instances the communication connection, which is illustrated, extends between two housing portion and/or through a hinged connection. Generally, in each of these instances, the communication connection is partially facilitated through a bus and/or port interface 26, 34, which can correspond to a bus interface, in accordance with the present invention, discussed below.

In the case of bus interface 26, the interface 26 serves to bridge the gap across the hinge, and facilitate a more direct connection between processor 12 and peripheral 24. This particular examples serves to illustrate, that while the present invention will generally refer to a bus interface, that the present invention may be equally applicable in instances in which the communication connection is more directly associated with a set of ports 22, as opposed to a communication connection via a communication bus 14. Consequently, reference to a bus interface is intended to additionally relate to an interface which is alternatively more directly coupled to a port.

In the case of bus interface 34, the interface 34 serves to illustrate a communication connection via a communication bus 16. Still further, not all peripheral communication connections via the bus 16, need to be supported by a bus interface 34, and that a bus interface 34 may support a communication connection with more than one peripheral. Still further, use of a bus interface is not necessarily restricted to connection which traverses a hinge, but may be used in alternative circumstances. Further yet, a communication connection which traverses a hinge does not necessarily need to be made via a bus interface, but that in certain circumstances, as noted in the background section, a communication connection, which traverses a hinge represents an instance in which the use of a bus interface, such as the one described in connection with the present invention, may be beneficially employed.

While each of the sets of communication ports are illustrated as involving a pair of communication paths, one skilled in the art will appreciate that alternative communication paths may involve an alternative number of communication paths, without necessarily departing from the teachings of the present invention, but that the use of two or more communication paths is consistent, in association with each of the communication connections, which can provide support for differential signaling and dual single ended signal paths, both modes of propagation being consistent with and readily associated with an environment involving a MIPI communication protocol, which is used in connection with the description of the present invention for illustrative purposes.

The peripherals could include various types of functional elements, including, but not limited to displays, cameras, memory circuits, and/or communication devices. Furthermore, while one end of the communication connection begins or ends at processor 12, it is possible that communication connection could be established between two or more elements, which may or may not involve a processor. In other words, a corresponding communication connection could be established more directly between two peripheral type units, for example.

Figure 2:
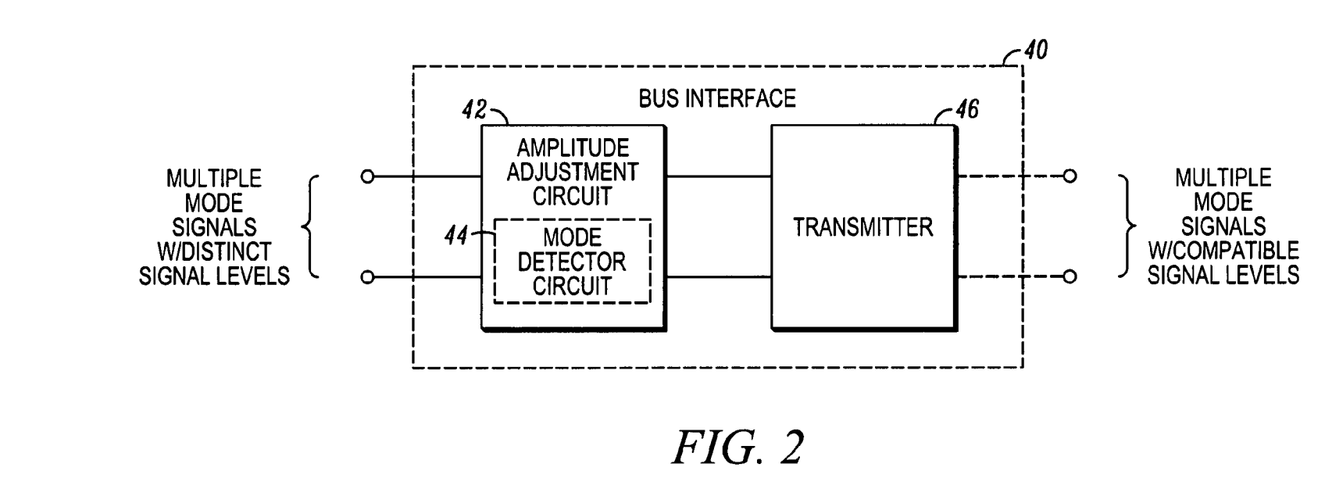
FIG. 2 is a block diagram of a bus interface, in accordance with at least one embodiment of the present invention.

FIG. 2 illustrates a block diagram of a bus interface 40, in accordance with at least one embodiment of the present invention. In the illustrated embodiment, the bus interface 40 includes an amplitude adjustment circuit 42, which has a mode detector circuit 44, which is adapted to receive signals for a communication protocol, that supports multiple modes, where at least a pair of the multiple modes involves communication signals, which have distinct signal levels. Generally, the MIPI communication protocol is consistent with a corresponding communication protocol, where the MIPI protocol involves at least a first mode corresponding to a lower speed communication mode, which has a relatively larger signal amplitude, and while the pair of communication paths in association with the lower speed communication mode, are largely referred to as dual single ended communication paths, a type of differential signaling can still be supported consistent with the relatively larger signal amplitude. Still further, while the lower speed communication mode is largely associated with the communication of control signals, which might manage any data flow associated with the first mode and/or another mode of operation, data signals can also be communicated while operating in the lower speed communication mode.

The MIPI communication protocol additionally involves a second mode corresponding to a higher speed communication mode, which generally has a relatively smaller signal amplitude, and which is more commonly implemented as a differential signal traditionally conveyed via a pair of communication paths. While the present discussion largely focuses on a pair of communication modes, the present invention is equally applicable to communication protocols which may involve a larger number of distinct communication modes, which similarly may be associated with further distinct signaling levels. Regardless of the number of modes, presumably the mode detector circuit 44 would be capable of distinguishing between the different modes, in order that the amplitude adjustment circuit might adjust the corresponding signal amplitudes so as to have compatible signal levels. The multiple mode signals with compatible signal levels are then communicated via a transmitter 46, which conveys the adjusted communication signal to circuitry, which is adapted to use the amplitude adjusted signal.

Figure 3A:
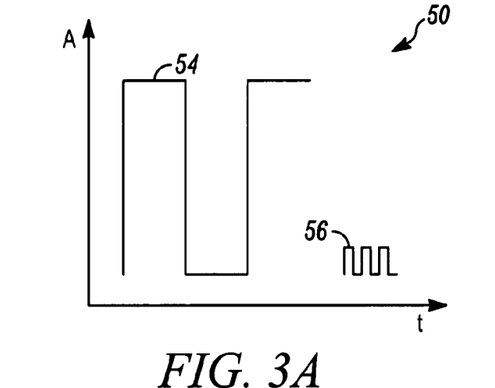
FIGS. 3A and 3B are exemplary graphs illustrating signal amplitude as a function of time before and after the amplitude has been selectively adjusted, in accordance with at least one embodiment of the present invention.
Figure 3B:
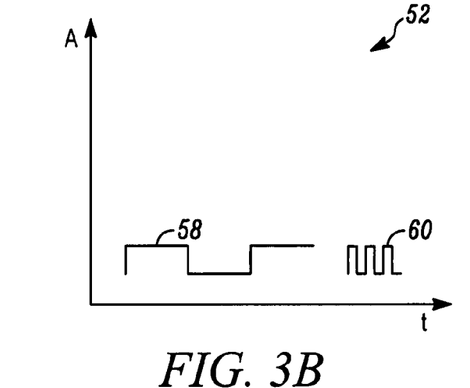

Examples of communication signals, consistent with multiple modes before and after adjustment, are illustrated in FIGS. 3A and 3B. More specifically, FIG. 3A illustrates an exemplary graph 50 intending to highlight multiple mode signals with distinct signal levels, and FIG. 3B illustrates an exemplary graph 52 intending to highlight multiple mode signals with compatible signal levels. Signal 54 corresponds to a signal associated with a lower speed communication mode, in accordance with at least one embodiment, prior to amplitude adjustment, whereas signal 56 corresponds to a signal associated with higher speed communication mode. Signal 58 corresponds to a signal associated with a lower speed communication mode, in accordance with at least one embodiment, after amplitude adjustment, whereas signal 60 corresponds to a signal associated with a higher speed communication mode.

In at least some instances, compatible signal levels includes signals for which the amplitudes of the communication signals for the multiple modes have been adjusted so that they are substantially the same, and/or have a substantially common amplitude.

It is noted that the illustrated signals are not necessarily drawn to scale, but are meant to serve as an example of a type of amplitude adjustment, which is consistent with respective multiple mode signals that respectively have distinct and compatible signal levels. In at least one embodiment, the amplitude of the lower speed communication mode can be approximately three times the signal amplitude of the higher speed communication mode, prior to adjustment. Furthermore the specific frequencies may similarly vary with at least one embodiment having a lower speed communication mode, which includes communication signals having an approximate frequency of less than 10 MHz, whereas a higher speed communication mode might include communication signals having an approximate frequency between 50 MHz and 750 MHz.

The signal conditioning between multiple mode signals with distinct signal levels and multiple mode signals with compatible signal levels, in at least one embodiment, is used in the conversion from electrical signals to optical signals and the corresponding conveyance of optical signals, whereas the higher amplitude signals may have a more detrimental impact on overall power usage, which may not be as pronounced if the signals were communicated electrically. Nevertheless, it is envisioned that under some circumstances, the corresponding conditioning may be appropriately employed in electrical communications and/or other types of communications with beneficial effect. In other words, the conveyance can be beneficially employed in non-optical communication systems without departing from the teachings of the present invention.

Figure 4:
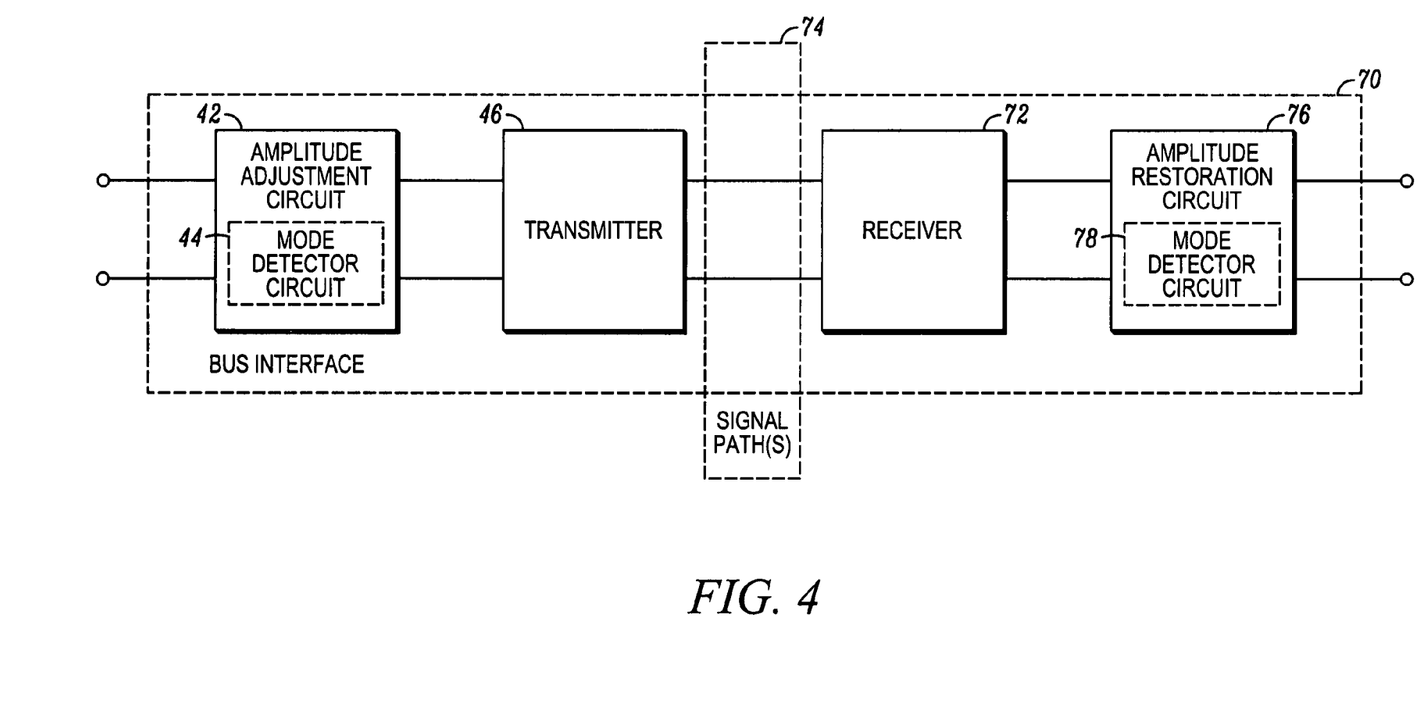
FIG. 4 is a block diagram of a further bus interface in accordance with at least one embodiment of the present invention.

FIG. 4 illustrates a block diagram of a further bus interface 70 in accordance with at least one embodiment of the present invention. In some respects, the bus interface 70 can be viewed as an extension of the bus interface illustrated in FIG. 2. More specifically, bus interface 70, in addition to converting the multiple mode signals with distinct signal levels to multiple mode signals with compatible signal levels, provides for a receiver 72, which receives a transmitted or conveyed signal, which was emitted by transmitter 46 and conveyed by one or more signal paths 74, such as one or more optical paths, which might propagate via free space, or via an optical conductor, such as a fiber optic cable, a wave guide and/or a lense, as well as any light emissive medium or material, which allows light to propagate in an intended direction. In at least one embodiment, at least a pair of signal paths is associated with a particular communication connection in order to facilitate potential differential signaling associated with one or more of the multiple modes.

The received signal is then forwarded to an amplitude restoration circuit 76, which is coupled to the receiver 72. The amplitude restoration circuit 76 includes a mode detector circuit 78, which is adapted for detecting the current mode of the signals, which are being received, which in turn is used to appropriately restore amplitude information, which may have been adjusted by the amplitude adjustment circuit 42. The amplitude restoration circuit 76, in accordance with at least one embodiment, effectively restores the distinct signal levels associated with the multiple mode signals.

In at least some instances, the mode detector circuit 78 can be adapted for detecting an appropriate mode, based upon signal characteristics, which may have been unaffected during the amplitude adjustment. An example of one such characteristic may include frequency. Still further analysis relative to other signal characteristics may additionally or alternatively enable a detection of mode. A further example includes power spectral density, which looks for the relative power levels across a spectrum of frequencies, where at times a higher frequency signal may appear to have lower frequency characteristics as a result of certain data sequences, which may limit the rate of data value transitions associated with adjacent data values.

In other instances, the mode detector circuit 78 may be configured to respond to an explicit mode select command or status indicator, which may be conveyed as control information in conjunction with any data being similarly communicated. For example with respect to the MIPI protocol specification, control information which is generally associated with the low speed communication mode, occurs at the beginning and end of the high speed data transfer, and can be detected by the presence of a common logic level on each of the pair of signal paths. Generally, a common logic level on each of the pair of signal paths, would be inconsistent with the high speed data mode, which in connection with the MIPI standard is differential in nature, and therefore a properly defined common logic level state associated with the low speed data transfer can readily be distinguished from any high speed differential data. In some instances, the amplitude adjustment circuit 42 and/or the mode detector circuit 44 associated with the amplitude adjustment circuit 42 may be the source of or alternatively similarly benefit from an explicit mode select command or status indicator.

Figure 5:
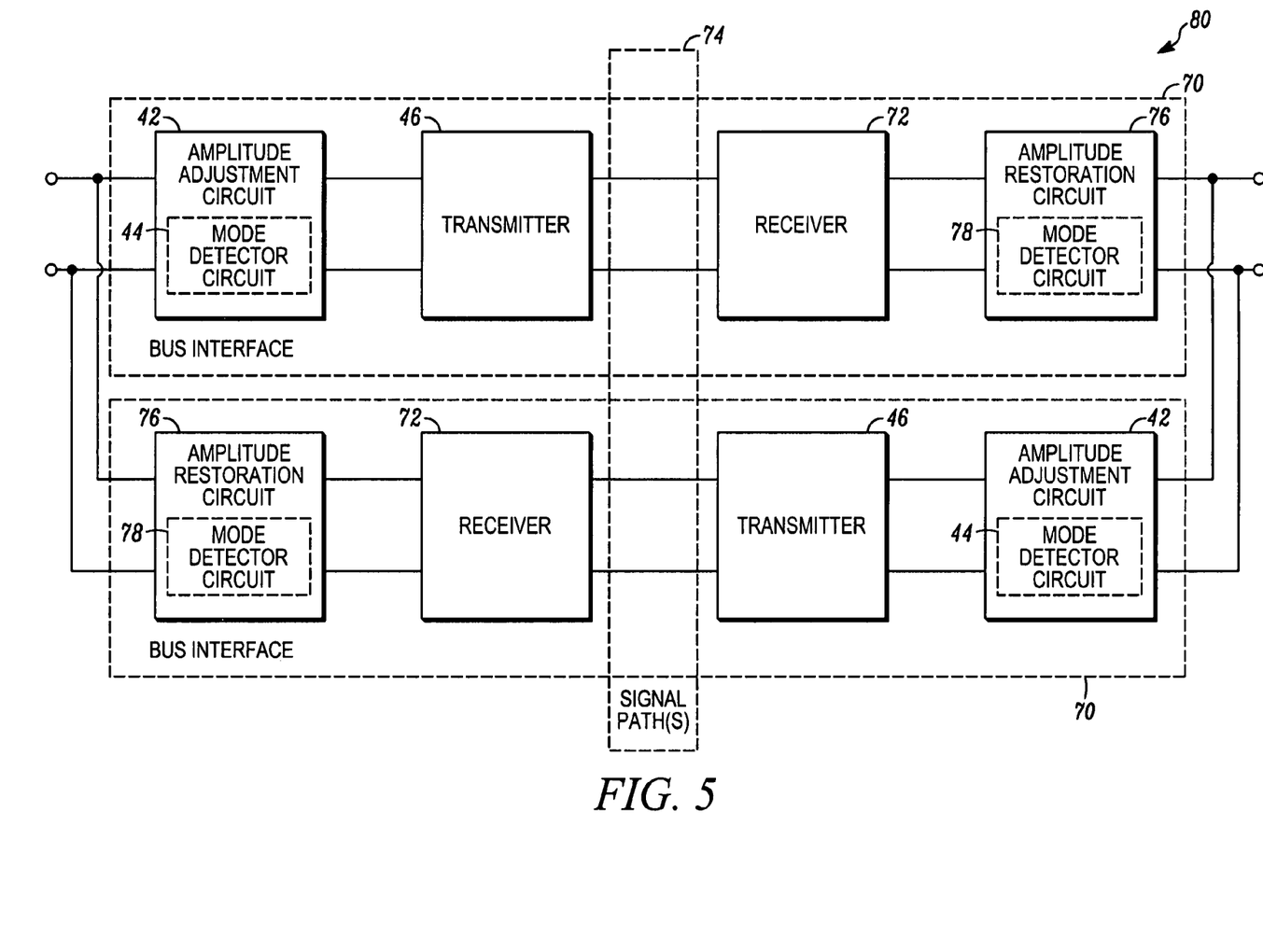
FIG. 5 is a block diagram of a still further bus interface, which incorporates a pair bus interfaces illustrated in FIG. 4 for purposes of supporting bi-directional communication, in accordance with at least one embodiment of the present invention.

FIG. 5 illustrates a block diagram of a still further bus interface 80, which incorporates a pair bus interfaces illustrated in FIG. 4 for purposes of supporting bi-directional communication, in accordance with at least one embodiment of the present invention. In the illustrated embodiment, the inputs of a first one of the pair of bus interfaces 70, associated with the input of the amplitude adjustment circuit 42, is coupled to the output of a second one of the pair of bus interfaces 70, associated with the output of the amplitude restoration circuit 76. Similarly, the inputs of the second one of the pair of bus interfaces 70, associated with the input of the amplitude adjustment circuit 42, is coupled to the output of the first one of the pair of bus interfaces 70, associated with the output of the amplitude restoration circuit 76.

The pair of bus interfaces 70 arranged in this manner will allow for signals to be conditioned for communication in each direction, thereby supporting bi-directional communication. Where the communications conveyed in each direction are not concurrent in time a form of half duplex communication is supported. At least one form of the MIPI protocol involves half duplex communication.

However in at least some instances, it is possible to support concurrent bi-directional or full duplex communication. In such an instance, the respective transmitter receiver pair might communicate in a manner such that the separate signal components associated with signals being communicated in opposite directions can be readily distinguished. In instances, where the transmitter and the receiver communicate signals optically, each transmitter receiver pair could employ a form of color diversity, where different spectral characteristics will allow the corresponding signals to be distinctly conveyed and detected. In this way, both directions of the bidirectional communication can share the same pair of signal paths.

Figure 6:
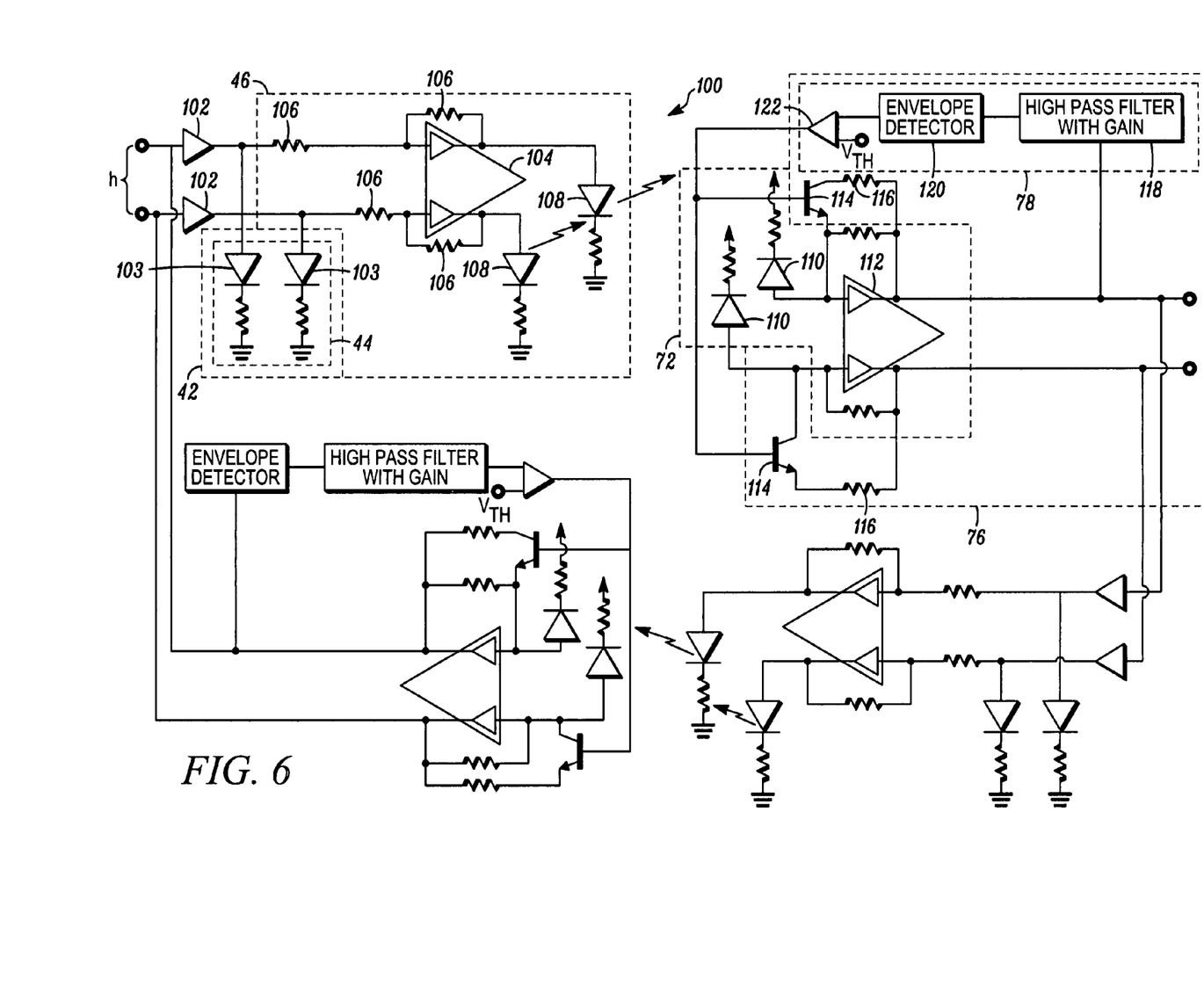
FIG. 6 is a more detailed circuit schematic of the bus interface illustrated in FIG. 5.

FIG. 6 is a more detailed circuit schematic 100 of the bus interface illustrated in FIG. 5. It is noted that similar to the bus interface illustrated in FIG. 5, the bus interface illustrated in FIG. 6 has two sets of largely identical circuitry for supporting the communication of signals in opposite direction. Consequently, only one of the directions will be described in detail, herein. It is envisioned that one skilled in the art will be able to readily apply the description associated with the forward direction circuitry to the reverse direction circuitry. Similarly, the circuitry associated with each direction, includes substantially similar circuitry associated with a pair of paths.

Similar to the embodiment of the bus interface 80 illustrated in FIG. 5, the bus interface 100 illustrated in FIG. 6, includes an amplitude adjustment circuit 42, and corresponding mode detector circuit 44, which are adapted for receiving the multiple mode signals, which includes distinct signal levels associated with at least a pair of the modes. The multiple mode signals are received via a number of respective buffers 102, corresponding to the number of signal paths. The buffer 102 serves to effectively isolate the signal conditioning associated with the amplitude adjustment circuit 42 from having an unintended affect upon the signals present on the rest of the signal bus 16.

In the illustrated embodiment, both the mode detection performed by the mode detect circuit 44 and the amplitude adjustment performed by the amplitude adjustment circuit 42 are similarly performed by a pair of respective diodes 103. The diodes are selected so as to have a turn on voltage threshold which corresponds to the desired resulting compatible signal level, which in the illustrated embodiment corresponds to the unadjusted signal amplitude of the relatively high speed, low amplitude, differential signal. In essence, the diodes will conduct when a signal is detected, that has an amplitude that is higher than selected turn on voltage threshold. Simultaneously, the diodes 103, act as voltage limiters, which will clip any voltage, which exceeds the voltage threshold, thereby producing resulting multiple mode signals, which have compatible signal levels.

One skilled in the art will appreciate that while the present embodiment combines the detection with the attenuation, that alternatively the two functions could have been implemented separately, without departing from the teachings of the present invention. For example, a comparator with one or more preset voltage thresholds could have been used to detect the mode, and the resulting signal could have been used to selectively attenuate the signal the desired amount. The selective attenuation could have been performed by a variable gain amplifier. It is further possible that it may be desirable to detect more than two modes, in which case additional comparators having the respective additional desired thresholds could be used, and/or additional diodes having an alternative desired turn on voltage threshold could additionally be used.

In the illustrated embodiment, the amplitude adjusted signal, in turn is fed to a driver circuit, in the form of a dual amplifier 104 and corresponding resistors 106, which supports both signal paths, and which supply a driving signal to a corresponding optical emitter 108, such as a light emitting diode or a laser diode. The selected resistor values will typically serve to define the gain of each of the dual amplifier 104.

In turn, the optical signal produced by the optical emitter 108 is detected by a corresponding pair of optical detectors 110, such as a photo transistor, where the resulting signal is used as an input to a further dual amplifier 112. The gain of the dual amplifier 112 can be controlled for purposes of restoring the amplitude of the signal associated with each of the respective modes. In the illustrated embodiment a pair of transistors 114 is used to control the insertion of additional resistance 116 into the portion of the circuitry, which defines the gain of the dual amplifier 112. The decision regarding the selective insertion of the additional resistance is governed by a mode detector circuit 78, which monitors for signal characteristics, which are unique to a particular mode, which has not been affected by the modifications associated with the amplitude adjustment and/or is still capable of being used to distinguish between modes.

In the illustrated embodiment, the mode detector circuit 78 of the amplitude restoration circuit 76 employs a power spectral density detector, which produces an output corresponding to the detected energy in one or more frequency bands of interest. The particular frequency bands, that are monitored, are determined by the high pass filter with gain 118. An envelope detector 120 is then used to smooth out the variability of the signal and track the corresponding envelope of the resulting signal. The resulting detected envelope is then compared against a predetermined threshold, via comparator 122, whose predetermined comparison threshold has been set to readily identify signals corresponding to a particular one of the modes. In the illustrated embodiment, the mode detector circuit 78 detects signal having the power spectral density associated with the higher frequencies.

Figure 7:
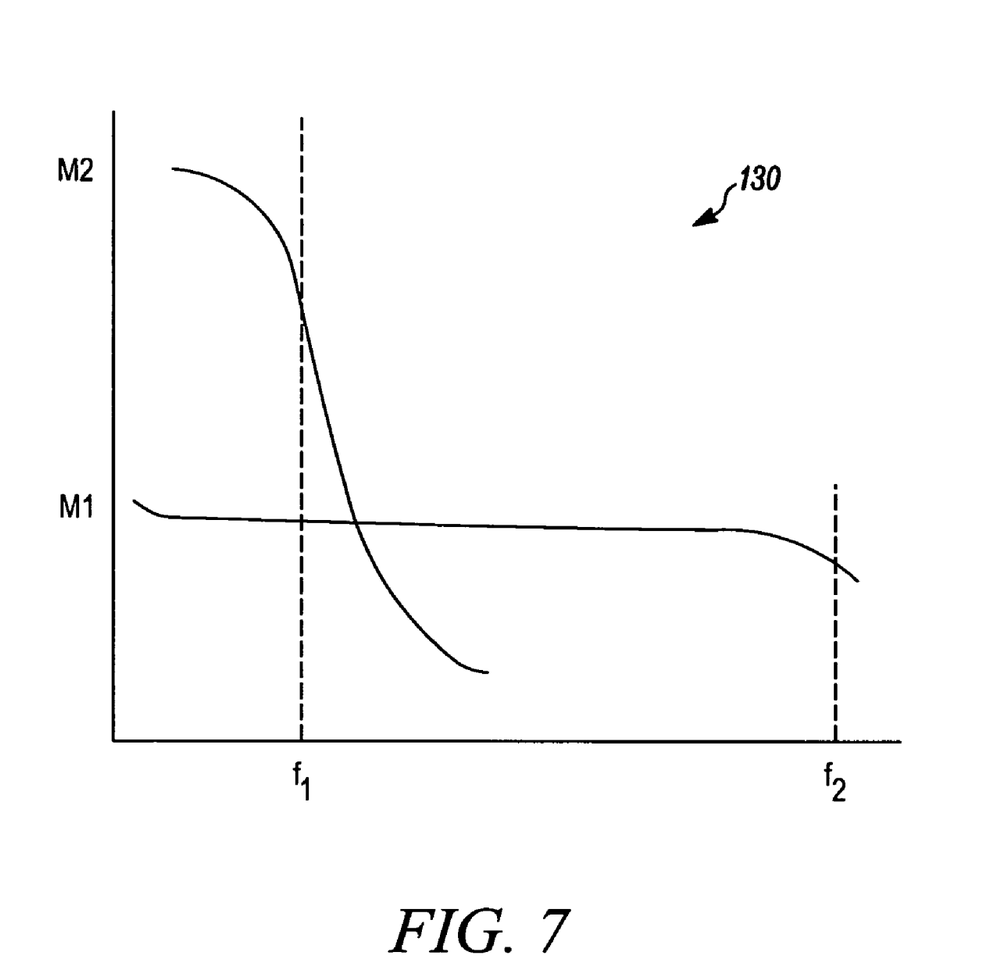
FIG. 7 is an exemplary graph of receive amplifier gain as a function of frequency as selectively configured for each of at least a pair of detected modes.

FIG. 7 illustrates an exemplary graph 130 of the amplifier gain of the dual amplifier forming part of the receiver, as a function of frequency as the dual amplifier is selectively configured for each of at least a pair of detected modes. By appropriately selecting the resistor values and the detection threshold, a selective variable gain can be implemented, which supports at least a pair of modes, including a relatively high speed, lower amplitude signal, and a relatively low speed, high amplitude signal, which is consistent with the expected modes in association with at least one implementation of a protocol in accordance with the MIPI specification.

Whereas the embodiment, illustrated in FIG. 6, selectively restores the amplitude by controlling the gain of the dual amplifier 112, relative to a single signal path, the amplitude gain could alternatively be restored through the use of one or more parallel and/or alternative paths, each path having a corresponding amount of gain associated with a particular mode, where each path can be selectively activated depending upon the particular mode that is detected.

Figure 8:
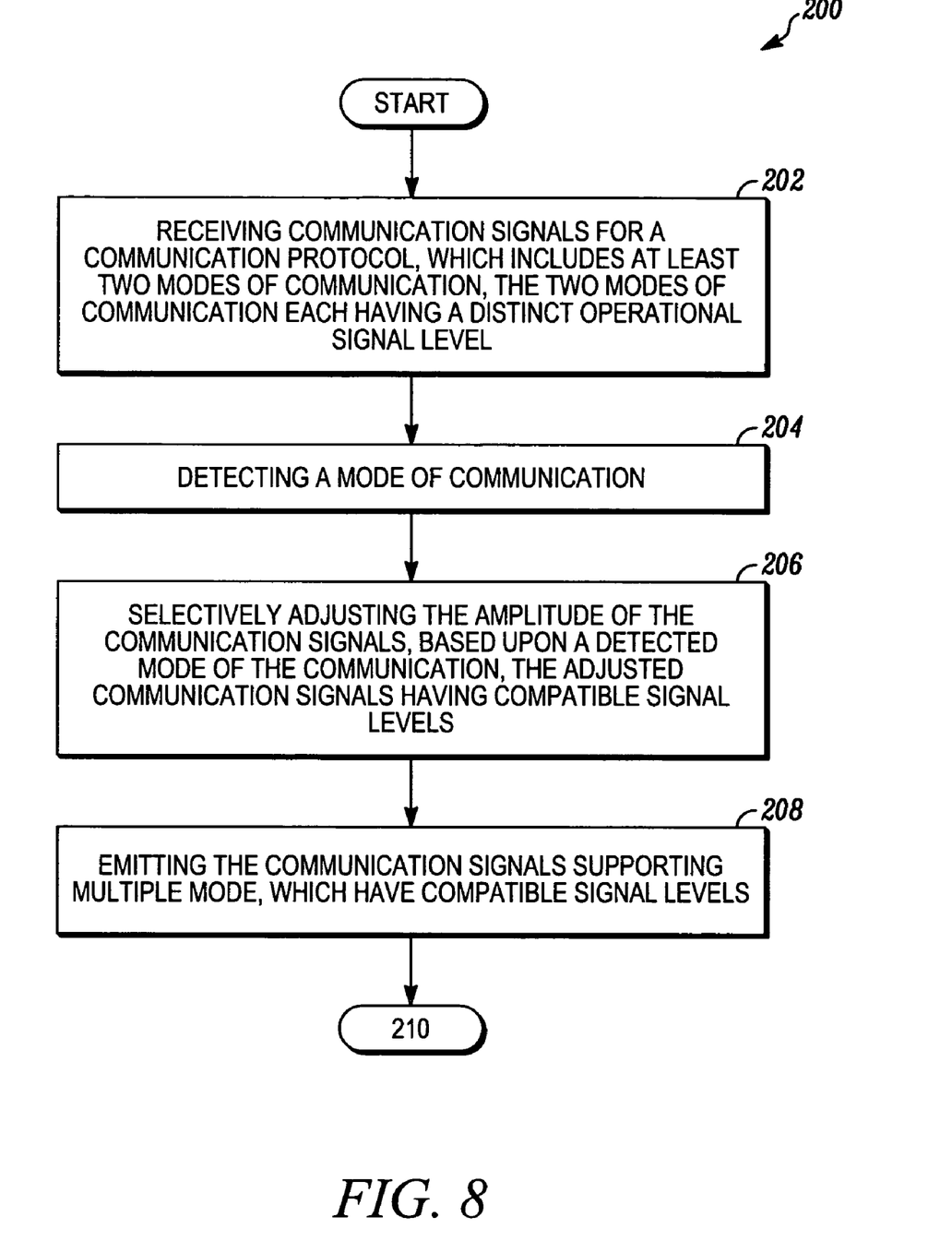
FIG. 8 is a flow diagram of a method for conveying signals between a communication bus and a device to be coupled to the communication bus, in accordance with at least one embodiment of the present invention.

FIG. 8 illustrates a flow diagram of a method 200 for conveying signals between a communication bus and a device to be coupled to the communication bus, in accordance with at least one embodiment of the present invention. The method 200 includes receiving 202 a communication signal for a communication protocol, which includes at least two modes of communication, the two modes of communication each having a distinct operational signal level. A mode of communication is then detected 204. The amplitude of the communication signals is then selectively adjusted 206, based upon a detected mode of the communication, the adjusted communication signals having compatible signal levels. The communication signals supporting multiple modes, which have compatible signal levels, are then emitted.

Figure 9:
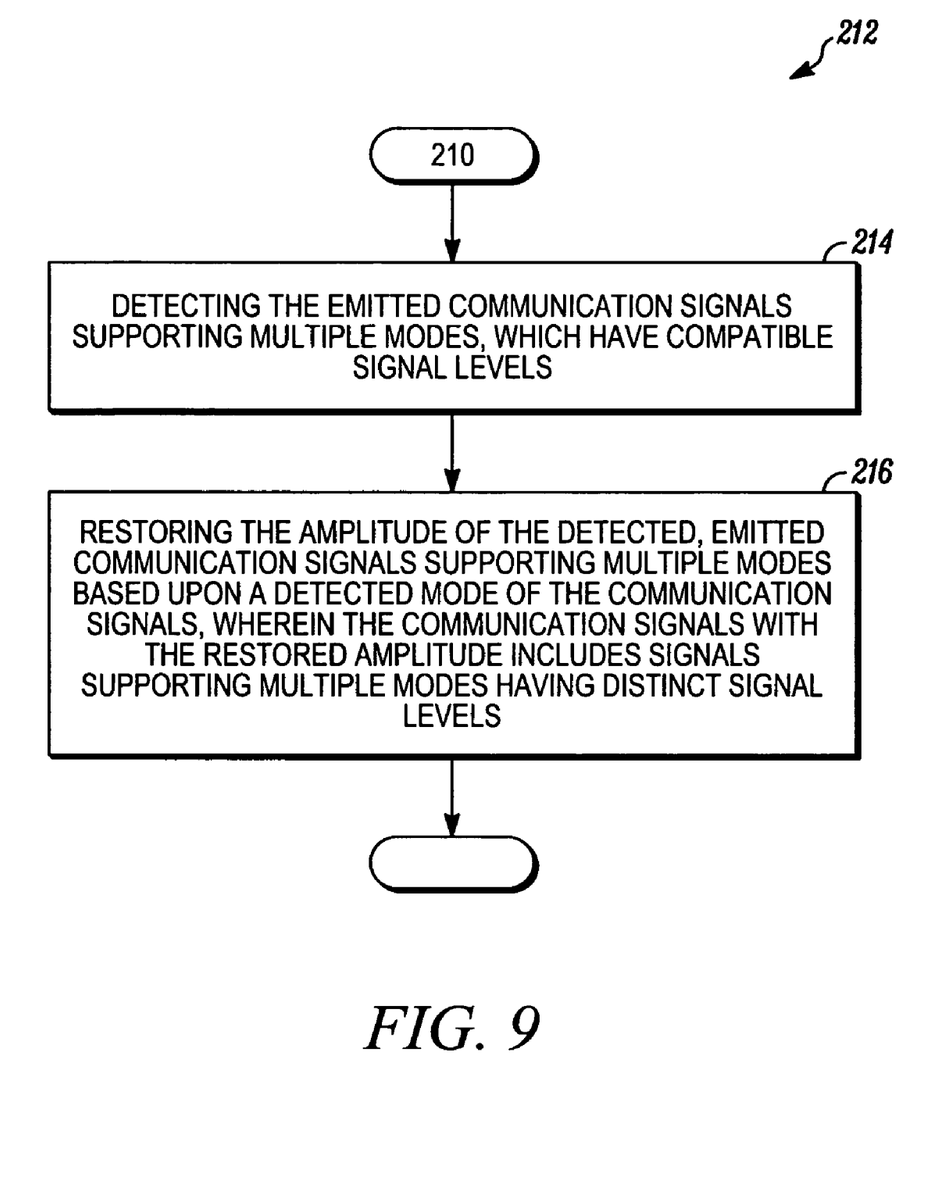
FIG. 9 is a flow diagram of optional additional features associated with the flow diagram illustrated in FIG. 8, for purposes of supplying communication signals to the device, which includes distinct signal levels in support of the multiple modes.

FIG. 9 illustrates a flow diagram 212 of optional additional features associated with the flow diagram 200 illustrated in FIG. 8, for purposes of supplying communication signals to the device, which includes distinct signal levels in support of the multiple modes. The additional features optionally include detecting 214 the emitted communication signals supporting multiple modes, which have compatible signal levels. The amplitude of the detected, emitted communication signals supporting multiple modes are then restored 216, based upon a detected mode of the communication signals, wherein the communication signals with the restored amplitude includes signals supporting multiple modes having distinct signal levels.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A bus interface for converting communication signals in a communication protocol, which includes a plurality of modes of communication, at least two of the modes of communication each having a distinct operational signal level, between communication signals having multiple distinct signal levels and communication signals having compatible signal levels, the bus interface comprising:
   an amplitude adjustment circuit, coupled to a communication bus and including a mode detector circuit, for selectively adjusting the amplitude of communication signals received from the communication bus, based upon a detected mode of the communication signals, and
   a transmitter coupled to the amplitude adjustment circuit for emitting amplitude adjusted communication signals received from the amplitude adjustment circuit, which includes signals supporting multiple modes having compatible signal levels.

2. A bus interface in accordance with claim 1, further comprising:
   a receiver communicatively coupled to the transmitter for detecting amplitude adjusted communication signals emitted by the transmitter; and
   an amplitude restoration circuit coupled to the receiver and including a mode detector circuit, for restoring the amplitude of the detected amplitude adjusted communication signals, based upon the detected mode of the detected amplitude adjusted communication signals, the amplitude restored detected amplitude adjusted communication signal including signals supporting the at least two modes having distinct signal levels.

3. A bus interface in accordance with claim 2, wherein the transmitter includes an optical emitter, and the receiver includes an optical detector.

4. A bus interface in accordance with claim 3, wherein the optical emitter and the optical detector are communicatively coupled via an optical conductor.

5. A bus interface in accordance with claim 2, wherein the mode detector circuit of the amplitude restoration circuit includes a signal frequency detector for detecting a signal having a signal frequency corresponding to one of the at least two modes of communication.

6. A bus interface in accordance with claim 1, wherein the mode detector circuit of the amplitude adjustment circuit includes a signal amplitude detector for detecting a signal having a signal amplitude corresponding to one of the at least two modes of communication.

7. A bus interface in accordance with claim 1, wherein the at least two modes of communication includes a first mode having communication signals, which originate as relatively high speed, low amplitude, differential signals, and a second mode having communication signals, which originate as dual, relatively low speed, high amplitude, single ended signals.

8. A bus interface in accordance with claim 1, wherein the at least two modes of communication includes a signal communicated via a common pair of signal paths.

9. A bus interface in accordance with claim 8, wherein the mode detector circuit of the amplitude adjustment circuit includes a comparator for monitoring the signal present on each of the common pair of signal paths, and detecting a common logic level being substantially concurrently present on each of the common pair of signal paths.

10. A bus interface in accordance with claim 2, wherein the at least two modes of communication includes a signal communicated via a shared pair of signal paths; and wherein the mode detector circuit of the amplitude restoration circuit includes a comparator for monitoring the signal present on each of the shared pair of signal paths, and detecting a common logic level being substantially concurrently present on each of the shared pair of signal paths.

11. A bus interface in accordance with claim 2, wherein the amplitude restoration circuit includes an amplifier, which is switchable between a lower gain, wider bandwidth state, and a higher gain, narrower bandwidth state.

12. A bus interface in accordance with claim 1, wherein the amplitude adjustment circuit includes a voltage limiter, which limits voltages greater than a predetermined threshold corresponding to an anticipated amplitude of communication signal in at least one of the at least two modes of communication.

13. A bus interface in accordance with claim 1, wherein communication signals in each of the at least two modes are communicated non-concurrently.

14. A bus interface in accordance with claim 2, wherein the bus interface supports simplex communication in a first direction.

15. A bus interface in accordance with claim 14, wherein said bus interface in conjunction with a corresponding additional second bus interface for communication in a second direction, opposite to the first direction, supports half duplex communication.

16. A bus interface in accordance with claim 14, wherein said bus interface in conjunction with a corresponding additional second bus interface for communication in a second direction, opposite to the first direction, supports full duplex communication.

17. A bus interface in accordance with claim 1, wherein the bus interface is incorporated as part of a wireless communication device.

18. A bus interface in accordance with claim 14, wherein the wireless communication device includes a two part housing including an upper housing and a lower housing, which are movably coupled together, wherein the bus interface conveys communication signals between the upper housing and the lower housing.

19. A full duplex bus interface for conveying communication signals in a communication protocol, which includes a plurality of modes of communication, at least two of the modes of communication each having a distinct operational signal level, the full duplex bus interface comprising:

a pair of simplex bus interfaces, each simplex bus interface having:

an amplitude adjustment circuit including a mode detector circuit, for selectively adjusting the amplitude of received communication signals, based upon a detected mode of the communication signals, a transmitter coupled to the amplitude adjustment circuit for emitting amplitude adjusted communication signals received from the amplitude adjustment circuit, which includes signals supporting multiple modes having compatible signal levels;

a receiver communicatively coupled to the transmitter for detecting amplitude adjusted communication signals emitted by the transmitter; and an amplitude restoration circuit coupled to the receiver and including a mode detector circuit, for restoring the amplitude of the detected amplitude adjusted communication signals, based upon the detected mode of the detected amplitude adjusted communication signals, the amplitude restored, detected, amplitude adjusted communication signal including signals supporting multiple modes having distinct signal levels; and wherein an input of the amplitude adjustment circuit of a first one of the pair of simplex bus interfaces is coupled to a communication bus for receiving communication signals, and an output of the amplitude restoration circuit is coupled to a device to be coupled to the communication bus; and wherein an input of the amplitude adjustment circuit of a second one of the pair of simplex bus interfaces is coupled to the device to be coupled to the communication bus, and an output of the amplitude restoration circuit is coupled to the communication bus.

20. A method for conveying signals between a communication bus and a device coupled to a communication bus comprising:

receiving communication signals for a communication protocol, which includes a plurality of modes of communication, at least two of the modes of communication each having a distinct operational signal level;

detecting a mode of the communication signals;

selectively adjusting the amplitude of the communication signals, based upon a detected mode of the communication signals, between communication signals having multiple distinct signal levels and communication signals having compatible signal levels; and emitting the communication signals supporting multiple modes, which have compatible signal levels.

21. A method in accordance with claim 20, further comprising:

detecting the emitted communication signals supporting multiple modes, which have compatible signal levels; and restoring the amplitude of the detected, emitted communication signals supporting multiple modes, which have compatible signal levels, based upon a detected mode of the communication signals, wherein the communication signals with the restored amplitude includes signals supporting the at least two modes of communication having distinct signal levels.

* * * * *